(12) United States Patent
Wolbach et al.

(10) Patent No.: US 9,565,185 B2
(45) Date of Patent: Feb. 7, 2017

(54) FACILITATION OF SEAMLESS SECURITY DATA TRANSFER FOR WIRELESS NETWORK DEVICES

(71) Applicant: AT&T Intellectual Property I, L.P., Atlanta, GA (US)

(72) Inventors: Eric B. Wolbach, Braselton, GA (US); Robert W. Bickerstaff, Atlanta, GA (US); Michael Frias, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/551,713

(22) Filed: Nov. 24, 2014

(65) Prior Publication Data

US 2016/0149911 A1    May 26, 2016

(51) Int. Cl.
| | |
|---|---|
| H04L 29/06 | (2006.01) |
| H04W 12/06 | (2009.01) |
| H04W 12/04 | (2009.01) |
| H04L 12/24 | (2006.01) |
| H04W 88/08 | (2009.01) |

(52) U.S. Cl.
CPC .......... *H04L 63/0853* (2013.01); *H04L 63/02* (2013.01); *H04L 63/08* (2013.01); *H04L 63/0892* (2013.01); *H04W 12/04* (2013.01); *H04W 12/06* (2013.01); *H04L 41/0869* (2013.01); *H04W 88/08* (2013.01)

(58) Field of Classification Search
CPC ...... H04L 63/08; H04L 63/0892; H04L 63/02; H04L 63/0853; H04W 12/06; H04W 12/04
See application file for complete search history.

(56) References Cited

U.S. PATENT DOCUMENTS

| | | | |
|---|---|---|---|
| 6,286,038 B1 * | 9/2001 | Reichmeyer | H04L 41/0213 709/220 |
| 6,311,275 B1 | 10/2001 | Jin et al. | |
| 6,857,009 B1 | 2/2005 | Ferreria et al. | |
| 7,051,087 B1 | 5/2006 | Bahl et al. | |
| 7,069,433 B1 | 6/2006 | Henry et al. | |
| 7,373,508 B1 | 5/2008 | Meier et al. | |

(Continued)

FOREIGN PATENT DOCUMENTS

| | | |
|---|---|---|
| EP | 2188794 A1 | 5/2010 |
| WO | 02095543 A2 | 11/2002 |

(Continued)

OTHER PUBLICATIONS

Grover, Sarthak, et al. "Peeking behind the NAT: an empirical study of home networks." Proceedings of the 2013 conference on Internet measurement conference. ACM, 2013.(pp. 377-390).*

(Continued)

*Primary Examiner* — Kari Schmidt
(74) *Attorney, Agent, or Firm* — Amin, Turocy & Watson, LLP

(57) ABSTRACT

Configuration and credential data associated with a wireless network can be stored by the wireless network or a by a gateway device associated with the wireless network. The configuration and credential data can be accessed via a user profile and pushed to unauthenticated wireless devices to authenticate the unauthenticated wireless devices for the wireless network. The configuration and credential data can be backed up via a manual, automatic, or semi-automatic back-up process.

20 Claims, 12 Drawing Sheets

(56) References Cited

U.S. PATENT DOCUMENTS

| | | | |
|---|---|---|---|
| 7,451,222 B2 | 11/2008 | Sullivan | |
| 7,689,716 B2 | 3/2010 | Short et al. | |
| 8,015,417 B2 | 9/2011 | Kato et al. | |
| 8,019,082 B1* | 9/2011 | Wiedmann | H04L 63/162 |
| | | | 370/245 |
| 8,074,070 B2 | 12/2011 | Rebo et al. | |
| 8,161,148 B2 | 4/2012 | Tamura | |
| 8,356,171 B2 | 1/2013 | Shatzkamer et al. | |
| 8,365,018 B2 | 1/2013 | McIntosh et al. | |
| 8,484,457 B2 | 7/2013 | Winkler et al. | |
| 8,495,729 B2 | 7/2013 | Park | |
| 8,626,204 B1* | 1/2014 | Oroskar | H04W 68/025 |
| | | | 370/335 |
| 8,667,148 B1 | 3/2014 | Turner | |
| 8,769,061 B2 | 7/2014 | Lancaster et al. | |
| 2003/0135596 A1* | 7/2003 | Moyer | H04L 41/5054 |
| | | | 709/223 |
| 2004/0133689 A1 | 7/2004 | Vasisht | |
| 2004/0168054 A1 | 8/2004 | Halasz et al. | |
| 2006/0002369 A1* | 1/2006 | Dowker | H04L 12/2801 |
| | | | 370/351 |
| 2006/0221940 A1* | 10/2006 | Ong | H04L 12/2856 |
| | | | 370/352 |
| 2007/0039039 A1* | 2/2007 | Gilbert | G06F 21/6218 |
| | | | 726/4 |
| 2007/0079113 A1 | 4/2007 | Kulkarni et al. | |
| 2007/0254634 A1* | 11/2007 | Costa-Requena | H04W 8/245 |
| | | | 455/412.1 |
| 2007/0287450 A1* | 12/2007 | Yang | H04L 63/06 |
| | | | 455/433 |
| 2009/0112878 A1* | 4/2009 | Denny | G06F 11/1461 |
| 2009/0150526 A1* | 6/2009 | Wu | H04L 12/2898 |
| | | | 709/220 |
| 2010/0265845 A1 | 10/2010 | Lampen | |
| 2011/0211219 A1* | 9/2011 | Bradley | H04W 48/16 |
| | | | 358/1.15 |
| 2011/0302619 A1* | 12/2011 | Hale | G08C 17/00 |
| | | | 725/110 |
| 2013/0094444 A1 | 4/2013 | Lai et al. | |
| 2014/0281540 A1* | 9/2014 | Brouwer | H04L 9/12 |
| | | | 713/169 |
| 2015/0128216 A1* | 5/2015 | Rolls, IV | H04W 12/06 |
| | | | 726/3 |

FOREIGN PATENT DOCUMENTS

| | | |
|---|---|---|
| WO | 2007041284 A2 | 4/2007 |
| WO | 2008091327 A2 | 7/2008 |
| WO | 2014052726 A1 | 4/2014 |

OTHER PUBLICATIONS

Pavlik, Jakub, et al. "Gateway redundancy protocols." Computational Intelligence and Informatics (CINTI), 2014 IEEE 15th International Symposium on. IEEE, 2014. (pp. 459-464).*

Fischer et al., "Experiences with BOWL: Managing an Outdoor WiFi Network (or How to Keep Both Internet Users and Researchers Happy?)," Proceedings of the 25th Large Installation System Administration Conference (LISA-11). 2011, 6 Pages.

Kim, et al., "802.11b Wireless LAN Authentication, Encryption, and Security," 18 pages.

Jones, "Enterprise Network Configuration and Change Management," 2003, 190 Pages.

Henry, et al., "WiFi: What's Next?" IEEE Communications Magazine, Dec. 2002, pp. 66-72, IEEE.

De Smedt, "D TF3. 2—Detailed Description of Residential Gateway and Advanced Features," 2005, 209 Pages.

* cited by examiner

FACILITATION OF SEAMLESS SECURITY DATA TRANSFER FOR WIRELESS NETWORK DEVICES

TECHNICAL FIELD

This disclosure relates generally to facilitating seamless security data transfer between network devices.

BACKGROUND

A wireless network is any type of computer network that uses wireless data connections for connecting network nodes. Wireless networking is a method by which homes, telecommunications networks and enterprise (business) installations avoid the costly process of introducing cables into a building, or as a connection between various equipment locations. Wireless telecommunications networks are generally implemented and administered using radio communication. This implementation takes place at the physical level (layer) of the open systems interconnection (OSI) model network structure. Examples of wireless networks include cell phone networks. Wi-Fi local networks, and terrestrial microwave networks.

Wireless security is the prevention of unauthorized access or damage to computers using wireless networks. The most common types of wireless security are Wired Equivalent Privacy (WEP) and Wi-Fi Protected Access (WPA). WPA2 uses an encryption device, which encrypts the network with a 256 bit key; the longer key length improves security over WEP. However, maintaining wireless network security measures across multiple devices can become cumbersome and reduce the effectiveness of the security measure.

The above-described background relating to wireless network security is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
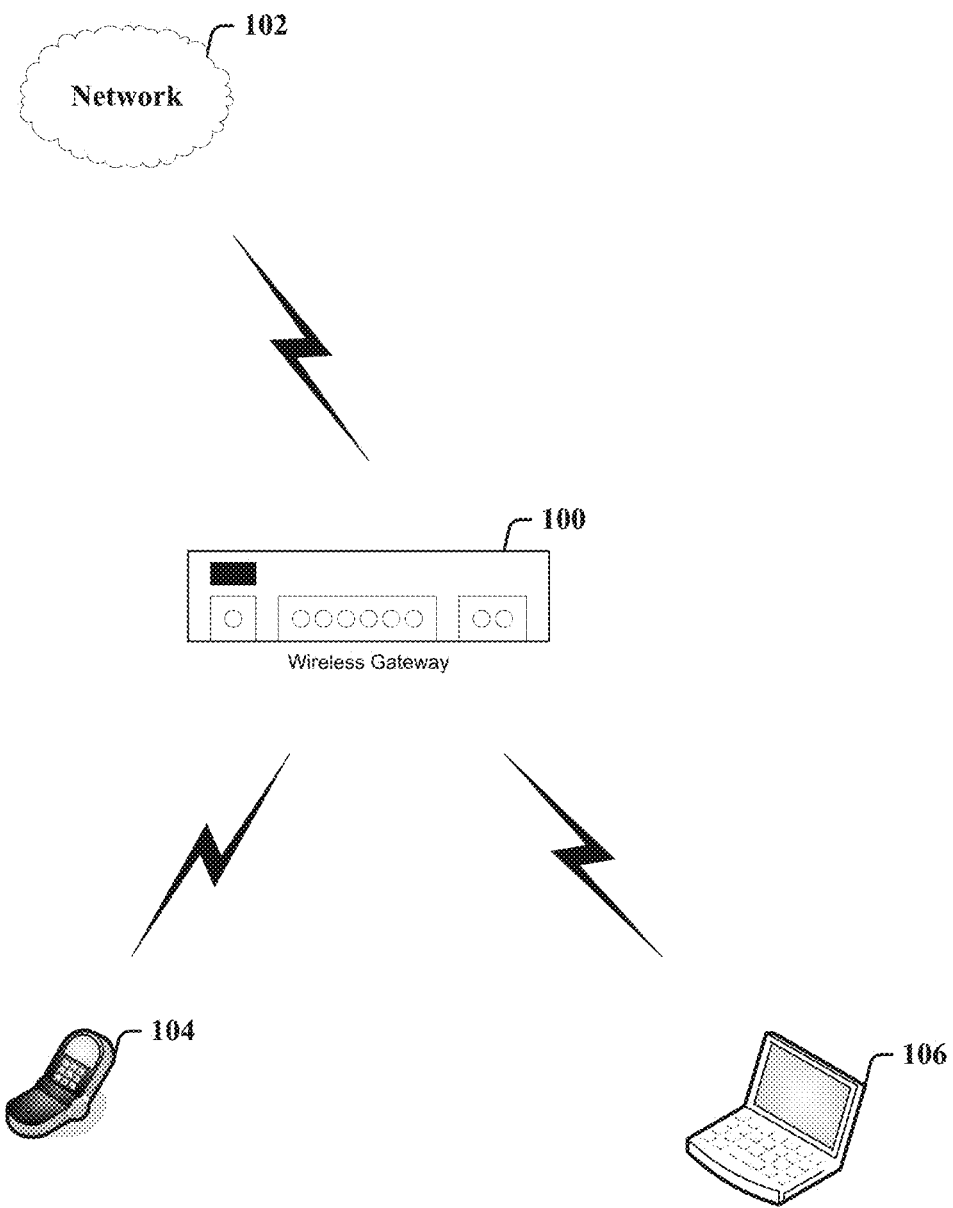
FIG. 1 illustrates a wireless network communicating with wireless network devices via a gateway device according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional cellular mobility management, various embodiments are described herein to facilitate a seamless handoff of communication between mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium.

Described herein are systems, methods, articles of manufacture, and other embodiments or implementations that can facilitate transmissions of network configuration and credential data amongst wireless network devices. Facilitating transmissions of network configuration and credential data can be implemented in connection with any type of device with a connection to the wireless network such as: a mobile handset, a computer, a handheld device, a printer or the like.

In order for new network devices to be paired with a wireless network, a user must program the Wi-Fi network name/service set identification (SSID) and Wi-Fi password/WEP key into the new network devices. Conversely, if a new gateway device, such as a router, is integrated into the wireless network, then the wireless devices in the network will need to update their Wi-Fi network name and Wi-Fi password associated with the new gateway device to communicate with the new gateway device. A gateway device can facilitate communication between several network devices and a wireless network.

The aforementioned scenario can be mitigated by backing-up SSIDs and Wi-Fi passwords from current devices within the wireless network. The SSIDs and Wi-Fi passwords can then be pushed to new devices, including new gateway devices, to prevent users of the current devices from having to manually change all of the current device credentials. Credentials, including SSID and WEP keys, associated with a gateway device can be backed-up by a wireless network and pushed to a new mobile device during a purchasing process.

A user account can be associated with the wireless network. Access to the user account can comprise user credentials including name and password(s). The user account can be used to seamlessly facilitate the transmission of credentials and configurations from one device to another. The user account can comprise data including, but not limited, to: SSIDs, WEP keys, configurations, number of devices, proximity information, etc. The user account can comprise a log of all active or dormant customer premises equipment (CPE) within a CPE management system. The CPE management system can comprise, but is not limited to, specific firewall settings, pinhole settings, port settings, gateway settings, and/or internet protocol (IP) address settings. Consequently, instead of a user having to memorize or document configurations and credentials associated with the aforementioned settings, this data can be stored within the user account and accessed via the CPE management system.

The user account can facilitate the generation of back-up copies of all data associated with the wireless network devices. A back-up can occur when the network performs an assessment of all configuration and credential data associated with the user's wireless network and then stores this information on the network. Previous back-ups can also be stored so that a user can access previous configuration and credential data should he need to. A back-up can be stored within the network and/or a gateway device of the wireless system. There can also be automatic or manual back-ups associated with the CPE listed within the user account.

Automatic back-ups can occur at specific default time intervals designated by the network or specific time intervals set by the user. A specific time interval designated by a user can override a default time interval. For instance, a default time interval for back-up may be once a month as set by the network. However, a user may want his credential and configuration data to be updated more regularly. Therefore, the user may set the back-up time period to an interval of every two weeks. Thus the network will back-up the user's wireless network credentials and configurations every two weeks instead of just once monthly.

A manual back-up can occur if a user goes into the user account and provides an input that performs a forced manual back-up of the configuration and credential data within the CPE management system. If the user has recently made changes to credentials or configurations associated with the wireless network and he does not want to wait for the automatic back-up time to cycle, the manual back-up can override an automatic back-up.

The user can also have the option to set a semi-automatic back-up within the CPE management system. The semi-automatic back-up function can back-up wireless device credentials and configurations anytime a change is made to any credential or configuration within the wireless network. For example, if a user changed the WEP key associated with his gateway device, the system could perform an automatic back-up upon recognizing that a change was made. Once a semi-automatic back-up has occurred, the system can then default to an automatic back-up schedule which was previously selected.

If a user has set up his user account to comprise credentials and configurations associated with his wireless network, then these credentials and configurations can be used to allow other network devices to access the wireless network. For instance, if the user purchases a new mobile device, an agent associated with the sale of the mobile device can access the user's user account and push credentials and configuration data from the user's wireless network to the user's new mobile device. The push can be facilitated via the internet, email, text message, short message service (SMS), Bluetooth, or any other wireless technologies. The purchase can take place in a physical store and an agent working in the store can do the push in real time. The agent can inspect the contents of back-up data found within the user profile or CPE system manager.

The user can purchase the new mobile device online or via the telephone and an agent can push the information to the mobile device prior to the mobile device being shipped to the user. In the instance where the user receives the mobile device and the mobile device has not been properly configured to communicate with the user's wireless network gateway, the user can either call an agent and have the agent do a push to the new mobile device or the user can access his user account and do a data push to the new mobile device via the user account. The user can also be prompted, by an unauthenticated mobile device, to retrieve existing credentials and configuration settings during a user self-install. The user prompt can be done in response to the wireless network gateway determining that an unauthenticated mobile device is trying to access/communicate, or is within range of, the wireless network gateway. The unauthenticated mobile device can also request an authentication, which will then prompt the user to access his CPE management system. To ensure that the correct customer has received the correct device, the system can require the user to register his mobile device with the network via the authentication process. The mobile device can be authenticated via an IP address or credentials provided by the user during the ordering process. Consequently, a validation of authentication can be displayed by an authenticated device and/or within the CPE management system.

In one embodiment, described herein is a method comprising a network device receiving and storing configuration data associated with other network devices of a network. The network device can then send the configuration data to a second network device and then receive an authentication request from a third network device before facilitating a transmission of the configuration data to the third network device.

According to another embodiment, a system can facilitate, the receiving of wireless network configuration data associated with a network device of a wireless network and a gateway device of the wireless network. The system can store the wireless network configuration data and then determine that another gateway device is communicating with the wireless network prior to sending the wireless network configuration data to the other gateway device.

According to yet another embodiment, described herein is a computer readable medium that can perform the operations comprising receiving wireless network configuration data associated with a user account related to a gateway device of a wireless network gateway and storing the network configuration data. The system can then use the wireless configuration data to configure a wireless network setting of a device to communicate with the gateway device. Furthermore, the system can receive and authenticate the gateway device to facilitate communication with the device.

These and other embodiments or implementations are described in more detail below with reference to the drawings.

Referring now to FIG. 1, illustrated is a wireless network communicating with wireless network devices via a gateway device. The wireless gateway device 100 can communicate with the wireless devices 104 106 and the network 102. The wireless gateway 100 can be configured and maintain user settings set by a user of the wireless gateway device 100. The user can configure the wireless gateway device 100 settings including, but not limited to, firewall settings, pinhole settings, port settings, IP address settings, etc. The wireless gateway device 100 can store credentials associated with wireless network access including, but not limited to, WEP keys, SSIDs, etc.

The credentials and configurations of the wireless gateway device 100 can be stored in the network 102 and on the wireless gateway device 100. Back-up copies of configuration and credential data can stored in the network 102 and at the gateway device 100. The back-up/storing can take place manually, automatically, or semi-automatically. In order for mobile devices 104 106 to communicate with the wireless gateway device 100 they can be authenticated via the wireless gateway device 100. The authentication process can comprise SSID and WEP key data. Input of the correct SSID and WEP key at the mobile devices 104 106 can allow the mobile devices 104 106 to register with the wireless gateway device 100. A validation of authentication can be displayed by the authenticated mobile devices 104 106 and/or within the user account CPE management system, which can be accessed via the network 102.

Figure 2:
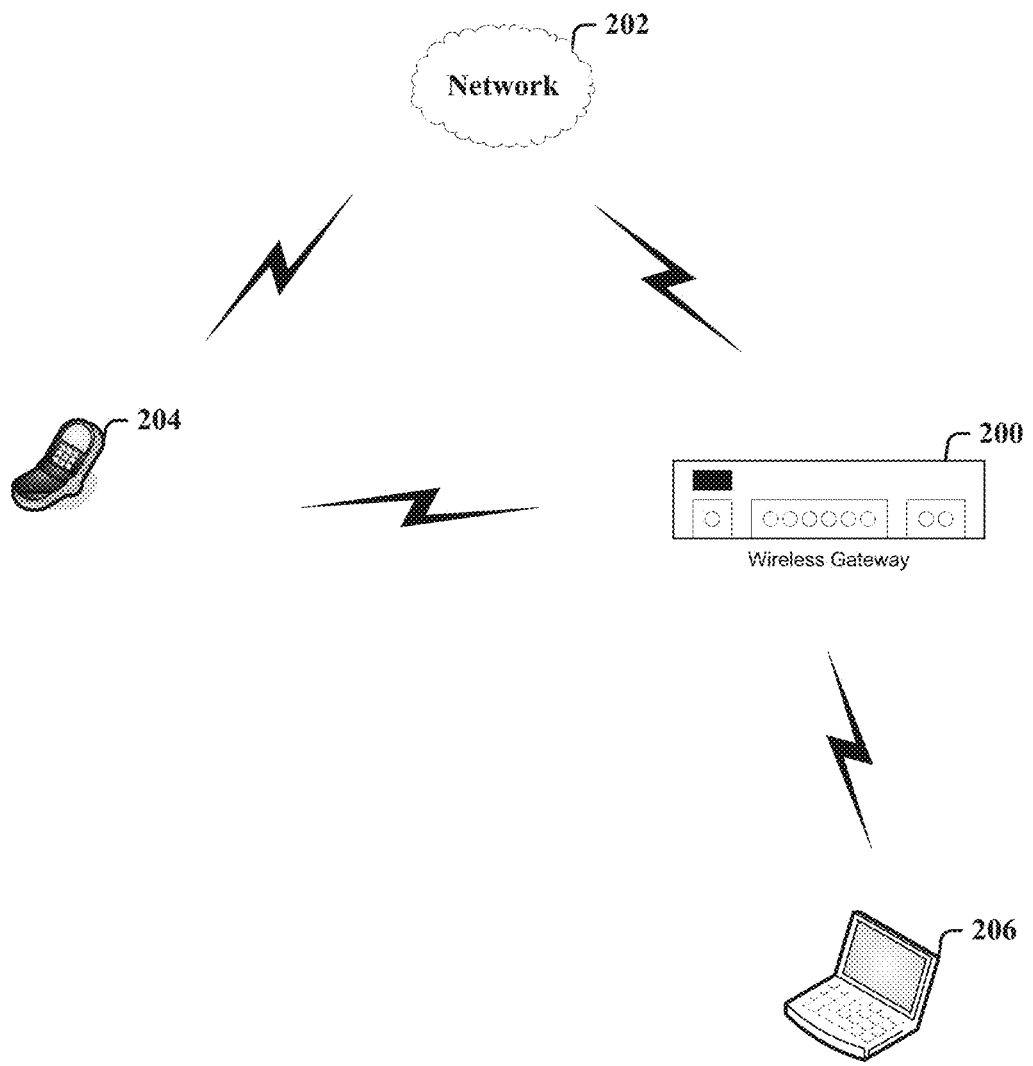
FIG. 2 illustrates a wireless network communicating with a network device and a network gateway device according to one or more embodiments.

Referring now to FIG. 2, illustrated is a wireless network communicating with a network device and a network gateway device. The wireless gateway device 200 can communicate with the wireless devices 204 206 and the network 202. The wireless gateway 200 can be configured and maintain user settings set by a user of the wireless gateway device 200. The user can configure the wireless gateway device 200 settings including, but not limited to, firewall settings, pinhole settings, port settings, IP address settings, etc. The wireless gateway device 200 can store credentials associated with wireless network access including, but not limited to, WEP keys, SSIDs, etc.

The credentials and configurations of the wireless gateway device 200 can be stored in the network 202 and on the wireless gateway device 200. Back-up copies of configuration and credential data can stored in the network 202 and at the gateway device 100. The back-up/storing can take place manually, automatically, or semi-automatically. In order for mobile devices 204 206 to communicate with the wireless gateway device 200 they can be authenticated via the wireless gateway device 200. The authentication process can comprise SSID and WEP key data. Input of the correct SSID and WEP key at the mobile devices 204 206 can allow the mobile devices 204 206 to register with the wireless gateway device 200. If the mobile device has 204 has not been properly configured to communicate with the user's wireless network gateway 200, the user can do a credential/configuration data push to the mobile device 204 via his user account. The user can also be prompted, by an unauthenticated mobile device 204, to retrieve existing credentials and configuration settings during a user self-install. The user prompt can be done in response to the wireless network gateway 200 determining that an unauthenticated mobile device 204 is trying to access/communicate, or is within range of, the wireless network gateway 200. The unauthenticated mobile device 204 can also request an authentication, which will then prompt the user to access his CPE management system. The correct SSID and WEP key data can be pushed from the network 202 to the mobile device 204. The push can be facilitated via the internet, email, text message, short message service (SMS), Bluetooth, or any other wireless technologies. A validation of authentication can be displayed by the authenticated mobile device 204 and/or within the user account CPE management system, which can be accessed via the network 202.

Figure 3:
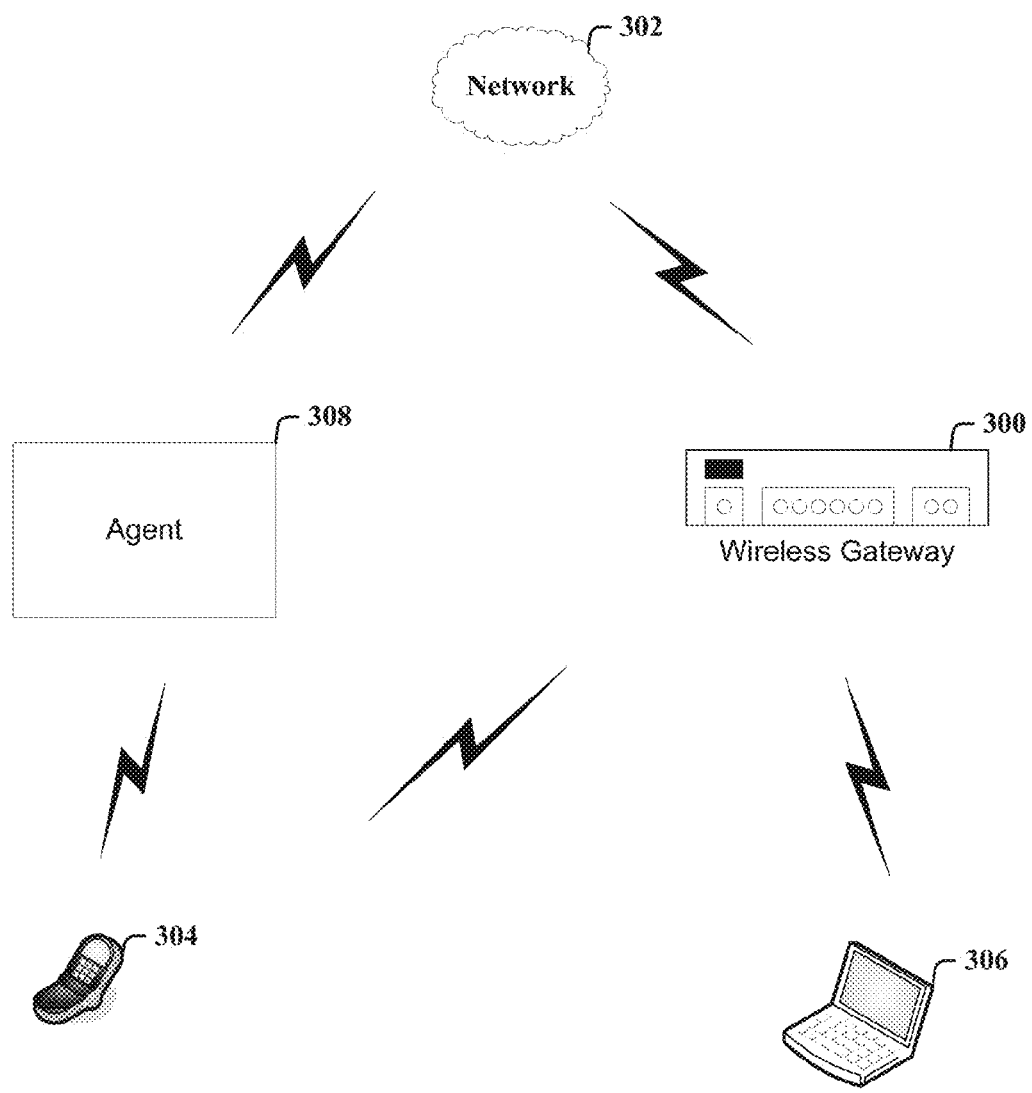
FIG. 3 illustrates a wireless network communicating with wireless network devices via an agent and wireless network gateway according to one or more embodiments.

Referring now to FIG. 3, illustrated is a wireless network communicating with wireless network devices via an agent and wireless network gateway. The wireless gateway device 300 can communicate with the wireless devices 304 306 and the network 302. The wireless gateway 300 can be configured and maintain user settings set by a user of the wireless gateway device 300. The user can configure the wireless gateway device 300 settings including, but not limited to, firewall settings, pinhole settings, port settings, IP address settings, etc. The wireless gateway device 300 can store credentials associated with wireless network access including, but not limited to, WEP keys, SSIDs, etc.

The credentials and configurations of the wireless gateway device 300 can be stored in the network 302 and on the wireless gateway device 300. Back-up copies of configuration and credential data can stored in the network 302 and at the gateway device 300. The back-up/storing can take place manually, automatically, or semi-automatically. In order for mobile devices 304 306 to communicate with the wireless gateway device 300 they can be authenticated via the wireless gateway device 300. The authentication process can comprise an SSID and WEP key data. Input of the correct SSID and WEP key at the mobile devices 304 306 can allow the mobile devices 304 306 to register with the wireless gateway device 300. If the mobile device 304 has not been properly configured to communicate with the user's wireless network gateway 300, the user can have an agent 308 to do a configuration/credential data push to the mobile device 304 in real time. The agent 308 can inspect the contents of back-up data found within the user profile or CPE system manager. The push can be facilitated via the internet, email, text message, short message service (SMS), Bluetooth, or any other wireless technologies. A validation of authentication can be displayed by the authenticated mobile device 304 and/or within the user account CPE management system, which can be accessed via the network 302.

Figure 4:
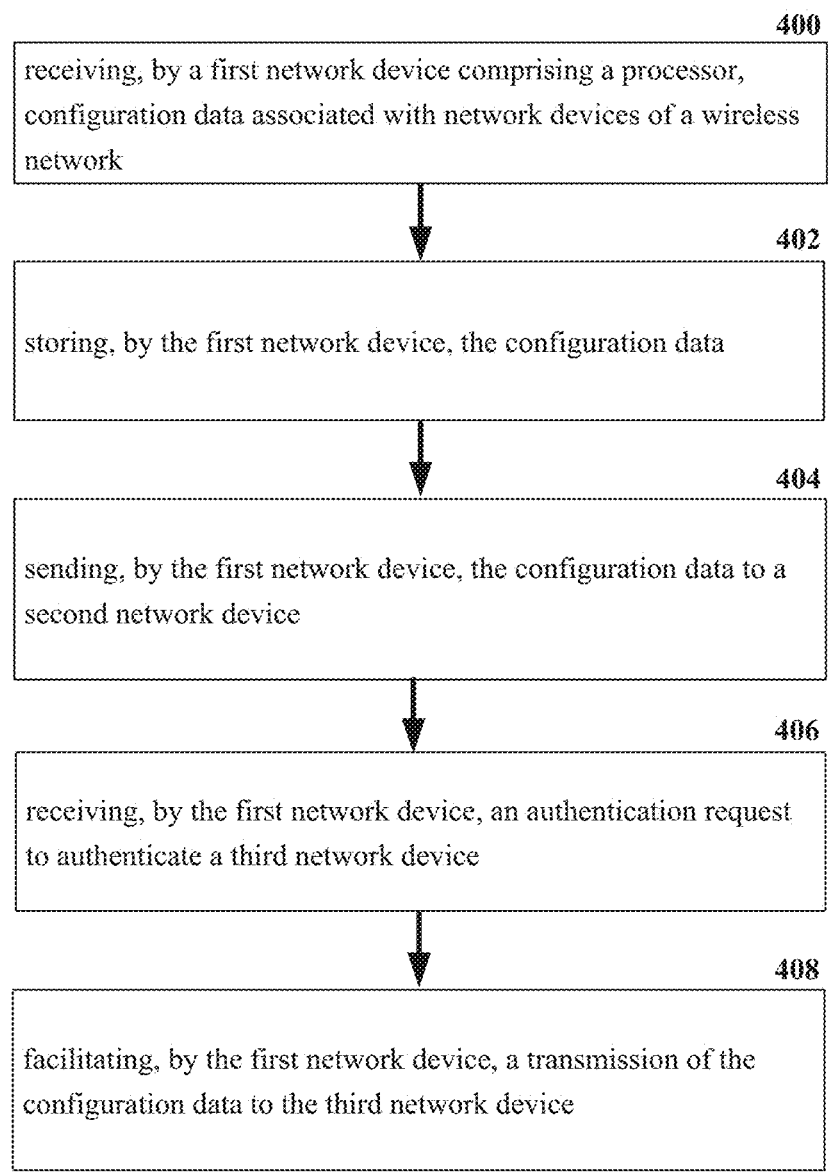
FIG. 4 illustrates a schematic system block diagram of a method for receiving wireless network configuration data and transmitting the data to another device according to one or more embodiments.

Referring now to FIG. 4, illustrated is a schematic system block diagram of a method for receiving wireless network configuration data and transmitting the data to another device. At element 400 configuration data associated with network devices of a wireless network can be received by a first network device and then stored at element 402. Back-up copies of configuration and credential data can stored in the network and at the gateway device. The back-up/storing can take place manually, automatically, or semi-automatically. The configuration data can then be sent to a second network device at element 404.

At element 406, the first network device can receive an authentication request from a third network device. The user of the third network device, which is unauthenticated, can be prompted to retrieve existing credentials and configuration settings during a user self-install. The user prompt can be done in response to the first network device of element 400 determining that an unauthenticated mobile device is trying to access/communicate with, or is within range of, the first network device. The unauthenticated mobile device can also request an authentication, which will then prompt the user to access his CPE management system. Upon receiving an authentication request from the third network, the first network device can facilitate a transmission of the configuration data to the third network device. Consequently, a validation of authentication can be displayed by the third network device, which has been authenticated, at element 408.

Figure 5:
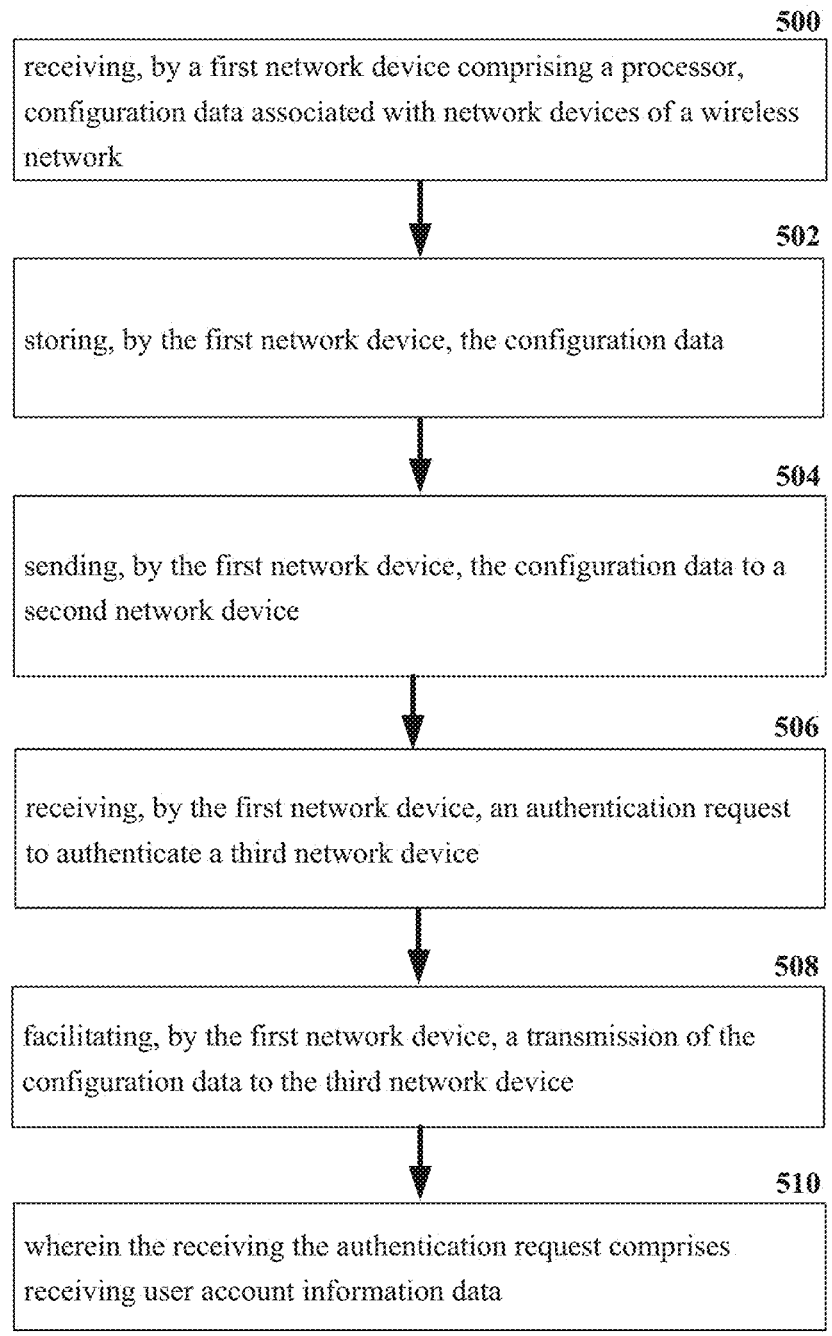
FIG. 5 illustrates a schematic system block diagram of a method for receiving wireless network configuration data and transmitting the data to another device in accordance with user account data according to one or more embodiments.

Referring now to FIG. 5, illustrated is a schematic system block diagram of a method for receiving wireless network configuration data and transmitting the data to another device in accordance with user account data. At element 500 configuration data associated with network devices of a wireless network can be received by a first network device and then stored at element 502. Back-up copies of configuration and credential data can stored in the network and at the gateway device. The back-up/storing can take place manually, automatically, or semi-automatically. The configuration data can then be sent to a second network device at element 504.

At element 506, the first network device can receive an authentication request from a third network device. The user of the third network device, which is unauthenticated, can be prompted to retrieve existing credentials and configuration settings during a user self-install. The user prompt can be done in response to the first network device of element 500 determining that an unauthenticated mobile device is trying to access/communicate with, or is within range of, the first network device. The unauthenticated mobile device can also request an authentication, which will then prompt the user to access his CPE management system. Upon receiving an authentication request from the third network, the first network device can facilitate a transmission of the configuration data to the third network device. Consequently, a validation of authentication can be displayed by the third network device, which has been authenticated, at element 508.

At element 510, the receiving the authentication request can comprise receiving user account information data. Access to the user account can comprise user credentials including name and password(s). The user account can be used to seamlessly facilitate the transmission of credentials and configurations from one device to another. The user account can comprise data including, but not limited, to: SSIDs, WEP keys, configurations, number of devices, proximity information, etc. The user account can comprise a log of all active or dormant customer premises equipment (CPE) within a CPE management system. The CPE management system can comprise, but is not limited to, specific firewall settings, pinhole settings, port settings, gateway settings, and/or internet protocol (IP) address settings. Consequently, instead of a user having to memorize or document configurations and credentials associated with the aforementioned settings, this data can be stored within the user account and accessed via the CPE management system.

Figure 6:
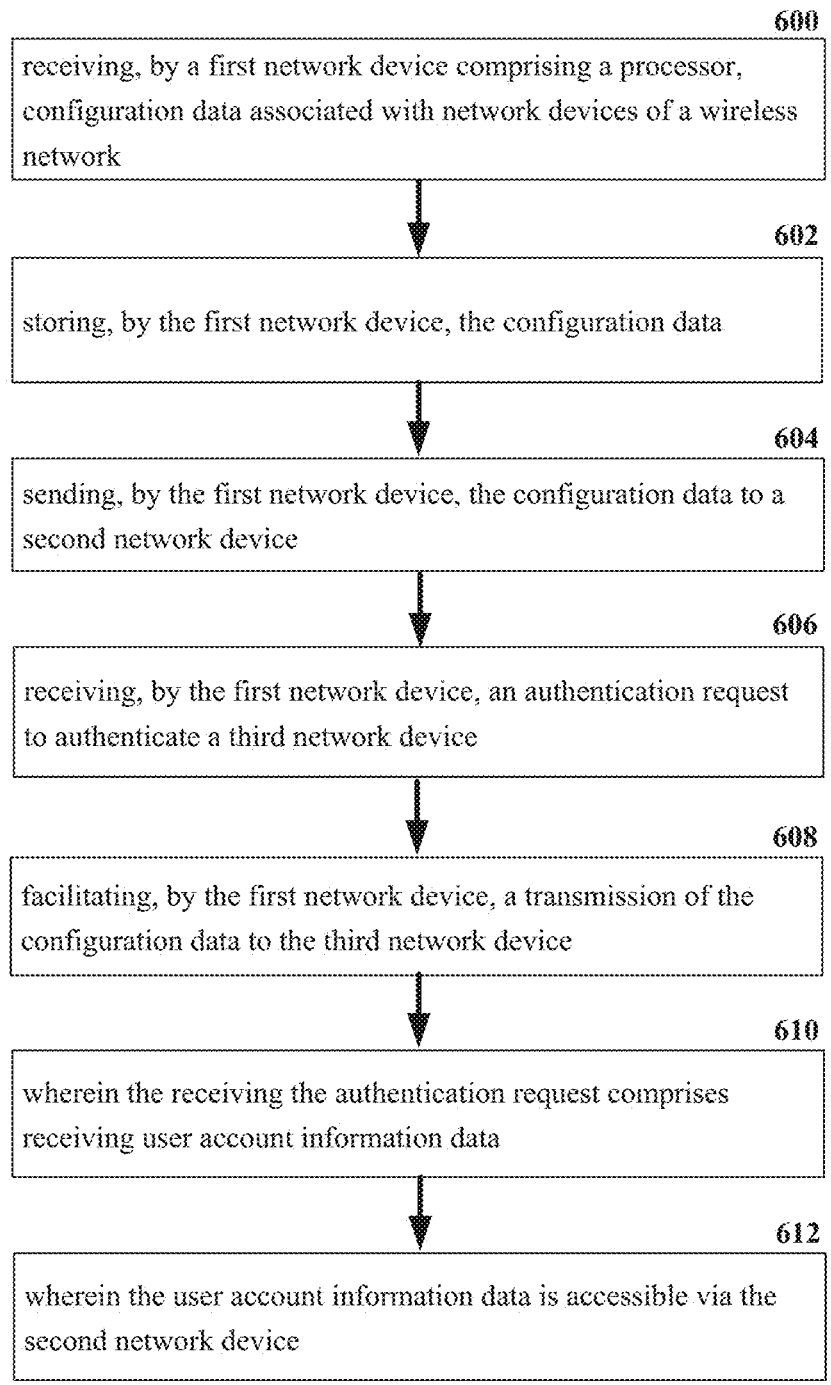
FIG. 6 illustrates a schematic system block diagram of a method for receiving wireless network configuration data and transmitting the data to another device in accordance with user account data accessible by the other device according to one or more embodiments.

Referring now to FIG. 6, illustrated is a schematic system block diagram of a method for receiving wireless network configuration data and transmitting the data to another device in accordance with user account data accessible by the other device. At element 600 configuration data associated with network devices of a wireless network can be received by a first network device and then stored at element 602. Back-up copies of configuration and credential data can stored in the network and at the gateway device. The back-up/storing can take place manually, automatically, or semi-automatically. The configuration data can then be sent to a second network device at element 604.

At element 606, the first network device can receive an authentication request from a third network device. The user of the third network device, which is unauthenticated, can be prompted to retrieve existing credentials and configuration settings during a user self-install. The user prompt can be done in response to the first network device of element 600 determining that an unauthenticated mobile device is trying to access/communicate with, or is within range of, the first network device. The unauthenticated mobile device can also request an authentication, which will then prompt the user to access his CPE management system. Upon receiving an authentication request from the third network, the first network device can facilitate a transmission of the configuration data to the third network device. Consequently, a validation of authentication can be displayed by the third network device, which has been authenticated, at element 608.

At element 610, the receiving the authentication request can comprise receiving user account information data. Access to the user account can comprise user credentials including name and password(s). The user account can be used to seamlessly facilitate the transmission of credentials and configurations from one device to another. The user account can comprise data including, but not limited, to: SSIDs, WEP keys, configurations, number of devices, proximity information, etc. The user account can comprise a log of all active or dormant customer premises equipment (CPE) within a CPE management system. The CPE management system can comprise, but is not limited to, specific firewall settings, pinhole settings, port settings, gateway settings, and/or internet protocol (IP) address settings. Consequently, instead of a user having to memorize or document configurations and credentials associated with the aforementioned settings, this data can be stored within the user account and accessed via the CPE management system. The user account information data can also be accessible via the second network device at element 612.

Figure 7:
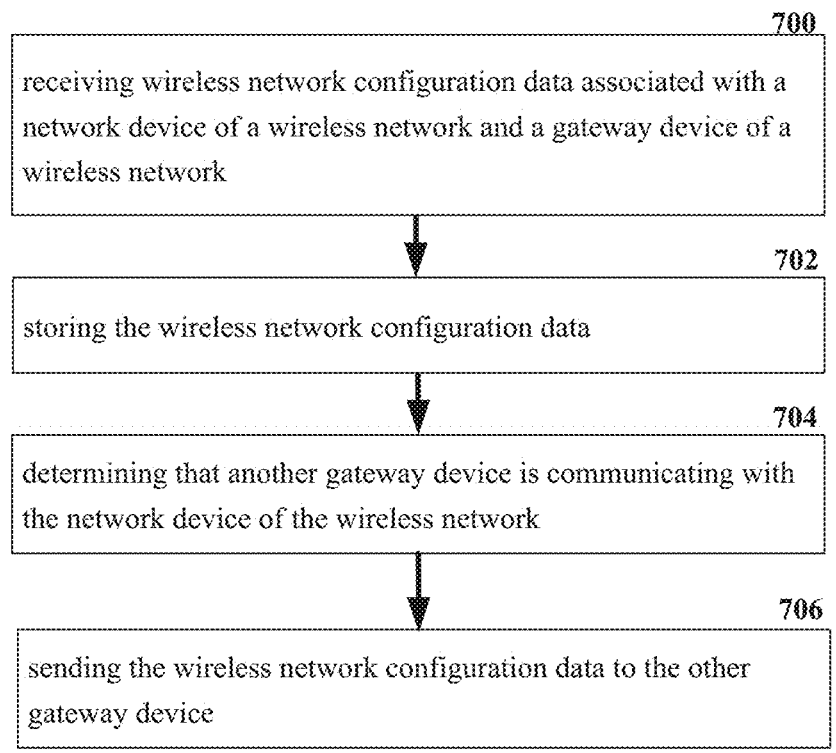
FIG. 7 illustrates a schematic system block diagram for receiving wireless network configuration data via a gateway device and sending the data to another gateway device according to one or more embodiments.

Referring now to FIG. 7, illustrated is a schematic system block diagram for receiving wireless network configuration data at a gateway device and sending the data to another gateway device. At element 700 wireless network configuration data associated with a network device of a wireless network and a gateway device of a wireless network can be received. Configuration data can be, but is not limited to, specific firewall settings, pinhole settings, port settings, gateway settings, and/or internet protocol (IP) address settings. At element 702 the configuration data can be stored by a system, which can also determine that another gateway device is communicating with a network device of the wireless network at element 704. A wireless network gateway can determine that an unauthenticated mobile device is trying to access/communicate the network, or is within range of, the wireless network gateway. Consequently, the wireless network configuration data can be sent to the other gateway device at element 706.

Figure 8:
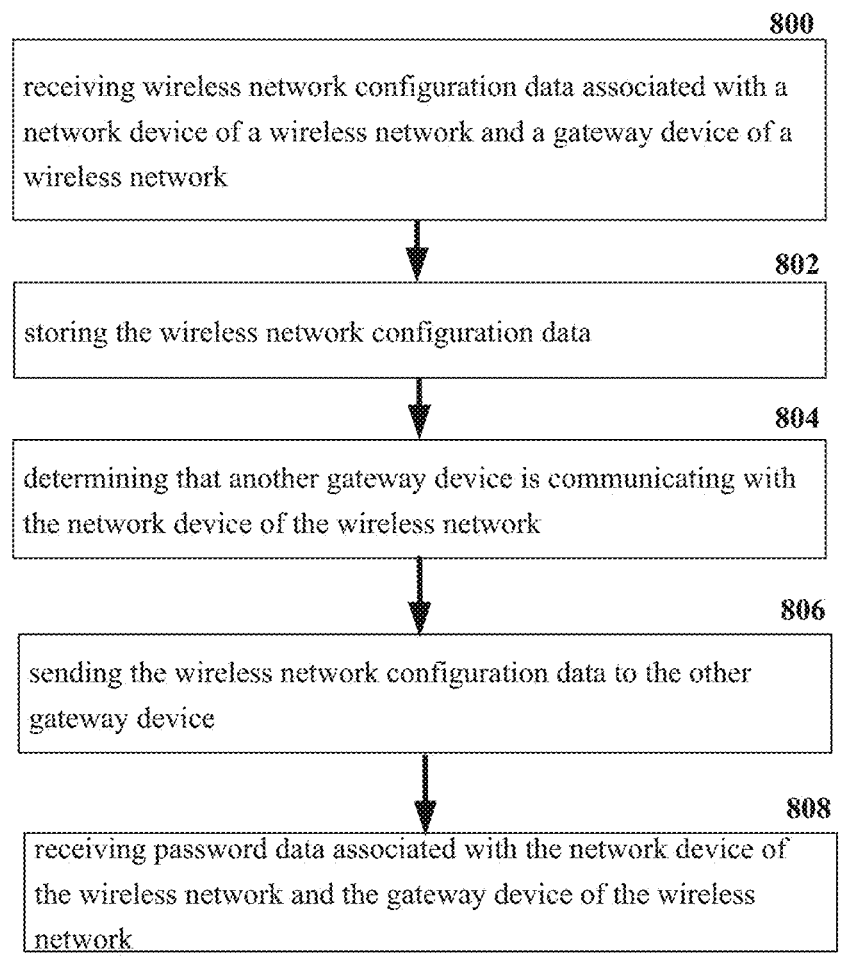
FIG. 8 illustrates a schematic system block diagram for receiving wireless network configuration data, comprising password data, at a gateway device and sending the data to another gateway device according to one or more embodiments.

Referring now to FIG. 8, illustrated a schematic system block diagram for receiving wireless network configuration data, comprising password data, at a gateway device and sending the data to another gateway device. At element 800 wireless network configuration data associated with a network device of a wireless network and a gateway device of a wireless network can be received. Configuration data can be, but is not limited to, specific firewall settings, pinhole settings, port settings, gateway settings, and/or internet protocol (IP) address settings. At element 802 the configuration data can be stored by a system, which can also determine that another gateway device is communicating with a network device of the wireless network at element 804. A wireless network gateway can determining that an unauthenticated mobile device is trying to access/communicate the network, or is within range of, the wireless network gateway. Consequently, the wireless network configuration data can be sent to the other gateway device at element 806. Credentials, including SSID and passwords/WEP keys, associated with a gateway device can be backed-up by a wireless network and pushed to a new mobile device during a mobile device purchase process. Thus, at element 808 password data associated with the network device of the wireless network and the gateway device of the wireless network gateway can be received by the system.

Figure 9:
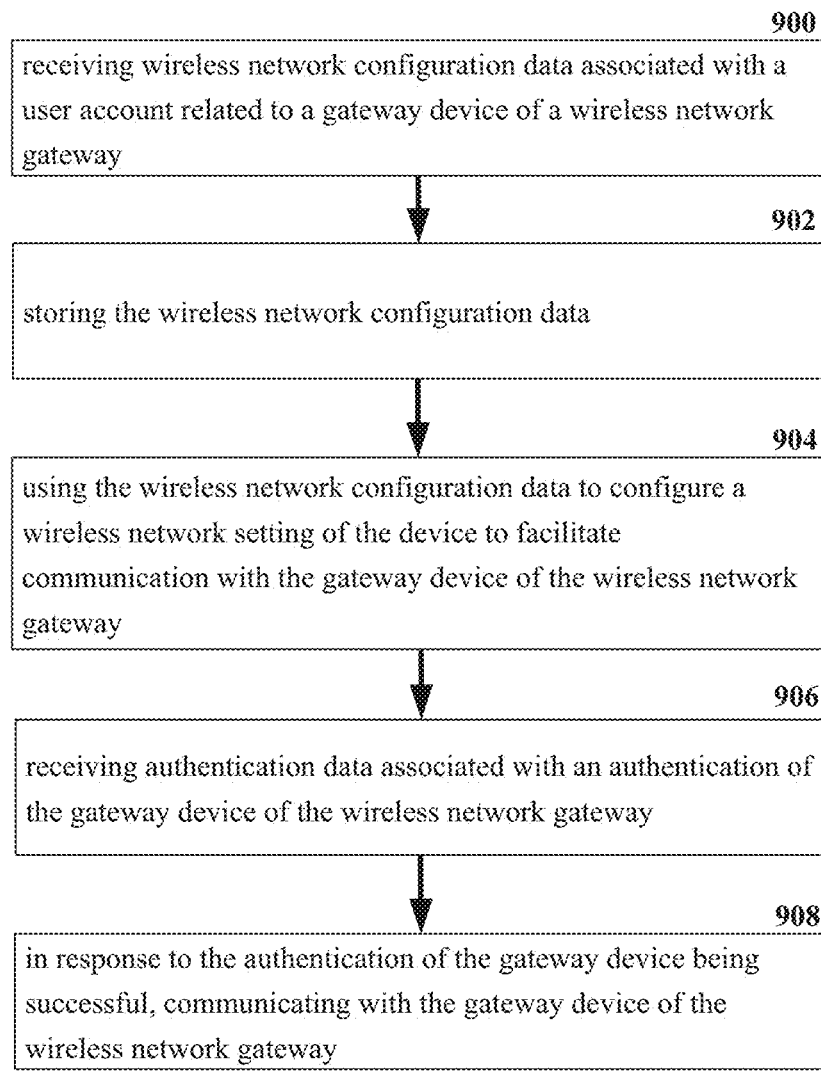
FIG. 9 illustrates a schematic system block diagram for receiving wireless network configuration data associated with a user account and communicating with a gateway device in response to an authentication according to one or more embodiments.

Referring now to FIG. 9, illustrated is a schematic system block diagram for receiving wireless network configuration data associated with a user account and communicating with a gateway device in response to an authentication according to one or more embodiments. At element 900 a device can receive wireless network configuration data associated with a user account related to a gateway device of a wireless network gateway. A user account can be associated with the wireless network. Access to the user account can comprise user credentials including name and password(s). The user account can be used to seamlessly facilitate the transmission of credentials and configurations from one device to another.

The user account can comprise data including, but not limited, to: SSIDs, WEP keys, configurations, number of devices, proximity information, etc. The user account can comprise a log of all active or dormant customer premises equipment (CPE) within a CPE management system. The CPE management system can comprise, but is not limited to, specific firewall settings, pinhole settings, port settings, gateway settings, and/or internet protocol (IP) address settings.

At element 902 the configuration data can be stored. The credentials and configurations of the wireless gateway device can be stored in the network and on the wireless gateway device. Back-up copies of configuration and credential data can stored in the network and at the gateway device. The system can use the wireless network configuration data to configure a wireless network setting of the device to facilitate communication with the gateway device of the wireless network at element 904.

The device can receive authentication data associated with an authentication of the gateway device of the wireless network gateway at element 906. In the instance where the user receives the gateway device and the gateway device has not been properly configured to communicate with the user's wireless network gateway, the user can either call an agent and have the agent do a push to the gateway device, or the user can access his user account and do a manual data push to the gateway device via the user account. The user can also be prompted, by an unauthenticated gateway device, to retrieve existing credentials and configuration settings during a user self-install. The user prompt can be done in response to the network device determining that an unauthenticated gateway device is trying to access/communicate, or is within range of, the wireless network. The unauthenticated gateway device can also request an authentication, which will then prompt the user to access his CPE management system.

To ensure that the correct customer has received the correct gateway device, the system can require the user to register his device with the network via the authentication process. The gateway device can be authenticated via an IP address or credentials provided by the user during the ordering process. Consequently, a validation of authentication can be displayed by the gateway device and/or within the CPE management system. At element 908, in response to the authentication of the gateway device being successful, the device can communicate with the gateway device of the wireless network gateway.

Figure 10:
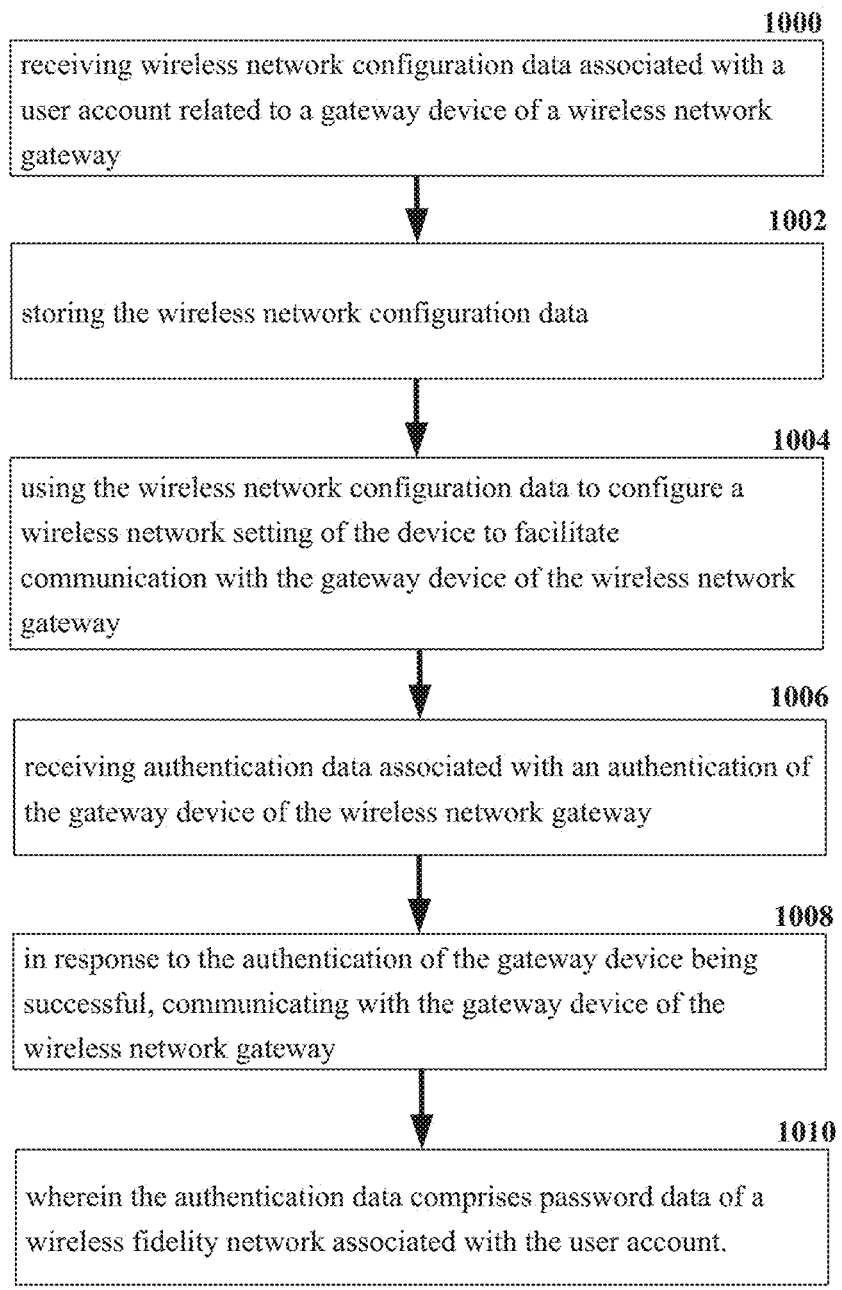
FIG. 10 illustrates a schematic system block diagram for receiving wireless network configuration data, comprising password data, associated with a user account and communicating with a gateway device in response to an authentication according to one or more embodiments.

Referring now to FIG. 10, illustrated is a schematic system block diagram for receiving wireless network configuration data, comprising password data, associated with a user account and communicating with a gateway device in response to an authentication. At element 1000 a device can receive wireless network configuration data associated with a user account related to a gateway device of a wireless network gateway. A user account can be associated with the wireless network. Access to the user account can comprise user credentials including name and password(s). The user account can be used to seamlessly facilitate the transmission of credentials and configurations from one device to another.

The user account can comprise data including, but not limited, to: SSIDs, WEP keys, configurations, number of devices, proximity information, etc. The user account can comprise a log of all active or dormant customer premises equipment (CPE) within a CPE management system. The CPE management system can comprise, but is not limited to, specific firewall settings, pinhole settings, port settings, gateway settings, and/or internet protocol (IP) address settings.

At element 1002 the configuration data can be stored. The credentials and configurations of the wireless gateway device can be stored in the network and on the wireless gateway device. Back-up copies of configuration and credential data can stored in the network and at the gateway device. The system can use the wireless network configuration data to configure a wireless network setting of the device to facilitate communication with the gateway device of the wireless network at element 1004.

The device can receive authentication data associated with an authentication of the gateway device of the wireless network gateway at element 1006. In the instance where the user receives the gateway device and the gateway device has not been properly configured to communicate with the user's wireless network gateway, the user can either call an agent and have the agent do a push to the gateway device or the user can access his user account and do a manual data push to the gateway device via the user account. The user can also be prompted, by an unauthenticated gateway device, to retrieve existing credentials and configuration settings during a user self-install. The user prompt can be done in response to the network device determining that an unauthenticated gateway device is trying to access/communicate, or is within range of, the wireless network. The unauthenticated gateway device can also request an authentication, which will then prompt the user to access his CPE management system.

To ensure that the correct customer has received the correct gateway device, the system can require the user to register his device with the network via the authentication process. The gateway device can be authenticated via an IP address or credentials provided by the user during the ordering process. Consequently, a validation of authentication can be displayed by the gateway device and/or within the CPE management system. At element 1008 in response to the authentication of the gateway device being successful, the device can communicate with the gateway device of the wireless network gateway. Credentials, including SSID and passwords/WEP keys, associated with a gateway device can be backed-up by a wireless network and pushed to the gateway device. Credentials, including SSID and passwords/WEP keys, associated with a gateway device can be backed-up by a wireless network and pushed to the gateway device. Thus, at element 1010 the authentication data can comprise password data of a wireless fidelity network associated with the user account.

Figure 11:
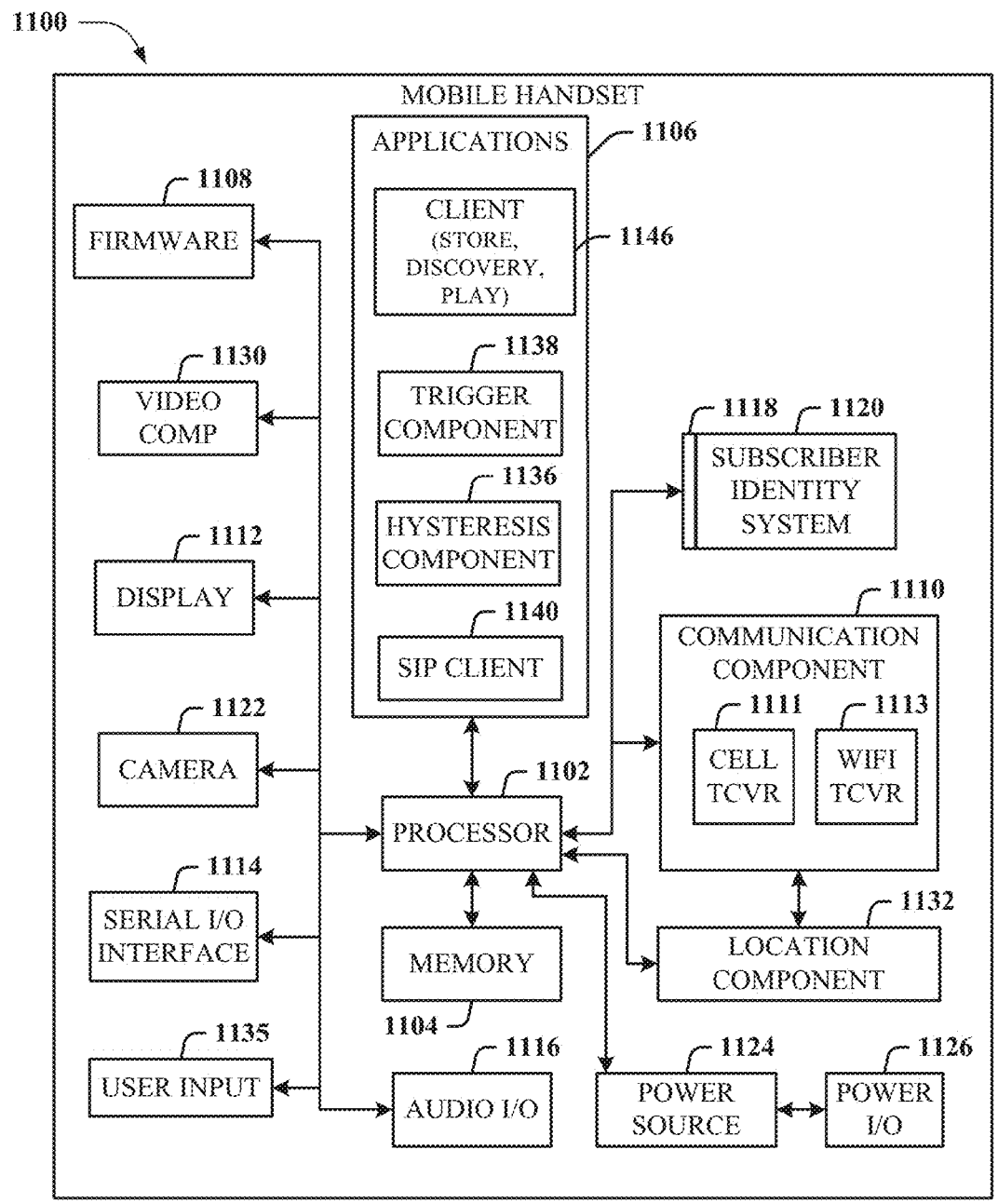
FIG. 11 illustrates a block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications.

The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
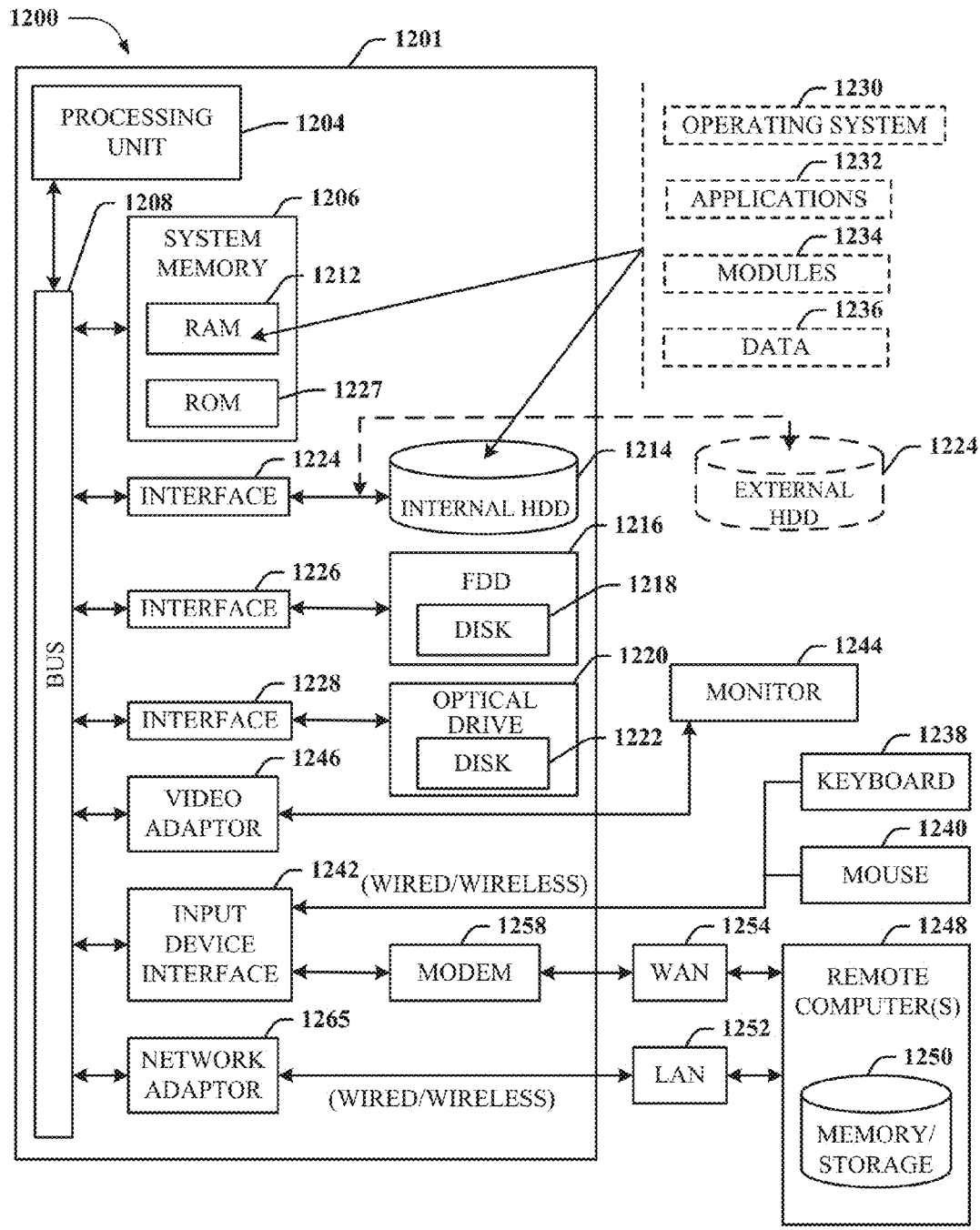
FIG. 12 illustrates a block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a first gateway device comprising a processor, configuration data associated with network devices of a wireless network;
sending, by the first gateway device, the configuration data to a second gateway device;
in response to the sending the configuration data, generating, by the first gateway device, first back-up data related to the configuration data;
in response to a condition associated with a default back-up time being determined to have been satisfied, initiating, by the first gateway device, a second back-up of the configuration data, resulting in second back-up data comprising an indication that the configuration data was sent to the second gateway device;

receiving, by the first network device, an authentication request to authenticate a third gateway device from a customer premises equipment account; and facilitating, by the first gateway device, a transmission of the second back-up data to the third gateway device, to facilitate validation of the third gateway device based on the authentication request.

2. The method of claim 1, wherein the receiving the authentication request comprises receiving user account information data.

3. The method of claim 2, wherein the user account information data is accessible via the second gateway device.

4. The method of claim 1, wherein the configuration data comprises firewall setting data.

5. The method of claim 1, further comprising:
requesting, by the first gateway device, an authentication of the third gateway device via the second network device.

6. The method of claim 5, further comprising:
receiving, by the first gateway device, a validation of the authentication of the third gateway device via the second gateway device.

7. The method of claim 1, further comprising:
validating, by the first gateway device, an authentication of the third gateway device.

8. A system, comprising:
a processor; and
a memory that stores executable instructions that, when executed by the processor, facilitate performance of operations, comprising:
receiving, by the processor, wireless network configuration data associated with a network device of a wireless network and a first gateway device of the wireless network;
storing, by the memory, the wireless network configuration data in a data structure associated with a customer premises equipment account;
determining, by the processor, that another a second gateway device is communicating with the first gateway device of the wireless network;
in response to the determining that the other second gateway device is communicating with the network device, initiating, by the processor, a first back-up, resulting in first back-up data, of the network configuration data;
sending, by the processor, the first back-up data to the data structure associated with the customer premises equipment account, resulting in an authentication validation of the second gateway device;
in response to the authentication validation, initiating, by the processor, a second back-up of the wireless network configuration data, resulting in second back-up data, wherein the second back-up data comprises authentication data associated with the authentication validation; and
sending, by the processor, the second back-up of the wireless network configuration data to the other second gateway device.

9. The system of claim 8, wherein the operations further comprise:

receiving, by the processor, password data associated with the network device of the wireless network and the gateway device of the wireless network.

10. The system of claim 8, wherein the operations further comprise:
receiving, by the processor, a copy of the wireless network configuration data.

11. The system of claim 10, wherein the copy is received in response to reception of a user input.

12. The system of claim 8, wherein the operations further comprise:
validating, by the processor, an internet protocol address via the other gateway device.

13. The system of claim 8, wherein the operations further comprise:
validating, by the processor, a user-credential via the other gateway device.

14. The system of claim 8, wherein the wireless network configuration data comprises a firewall setting.

15. A non-transitory machine-readable storage medium, comprising executable instructions that, when executed by a processor, facilitate performance of operations, comprising:
receiving wireless network configuration data associated with a customer premises user account related to a first gateway device of a wireless network gateway;
initiating a first back-up of the wireless network configuration data in response to the receiving the wireless network configuration data, resulting in first back-up data;
sending the first back-up data to a device associated with a customer premises equipment user account to configure a wireless network setting of a second gateway device to facilitate communication with the first gateway device of the wireless network gateway;
receiving authentication data associated with an authentication of the second gateway device of the wireless network gateway, resulting in an authentication validation;
initiating a second back-up, of the wireless network configuration data, at a predefined time in response to the receiving the authentication data, resulting in second back-up data;
sending a first indication of the authentication validation to the first gateway device;
sending a second indication of the authentication validation to the user account; and
in response to the receiving the authentication data associated with the second gateway device, facilitating communication of the first gateway device with the second gateway device of the wireless network gateway.

16. The non-transitory machine-readable storage medium of claim 15, wherein the authentication data comprises password data of a wireless fidelity network associated with the user account.

17. The non-transitory machine-readable storage medium of claim 15, wherein the authentication data comprises name data of a wireless fidelity network associated with the first gateway device of the wireless network gateway.

18. The non-transitory machine-readable storage medium of claim 15, wherein the wireless network configuration data comprises static internet protocol address data associated with the first gateway device of the wireless network gateway.

19. The non-transitory machine-readable storage medium of claim 15, wherein the receiving the wireless network configuration data comprises receiving a text message.

20. The non-transitory machine-readable storage medium of claim 15, wherein the wireless network configuration data comprises port setting data associated with a port of the first gateway device of the wireless network gateway.

\* \* \* \* \*